United States Patent [19]

Burgett

[11] Patent Number: 5,448,849

[45] Date of Patent: Sep. 12, 1995

[54] ICE FISHING APPARATUS

[76] Inventor: Wayne T. Burgett, 60 Corbett St., Lowell, Mass. 01852

[21] Appl. No.: 287,767

[22] Filed: Aug. 9, 1994

Related U.S. Application Data

[63] Continuation of Ser. No. 67,525, May 24, 1993, abandoned.

[51] Int. Cl.⁶ .............................................. A01K 97/12
[52] U.S. Cl. ...................................................... 43/17
[58] Field of Search .............................................. 43/17

[56] References Cited

U.S. PATENT DOCUMENTS 5,339,558  8/1994  Monsen ................................... 43/17

Primary Examiner—Kurt Rowan
Attorney, Agent, or Firm—Pearson & Pearson

[57] ABSTRACT

Ice fishing apparatus includes a solar energy collecting plate for location on the ice over a hole in the ice and a vertical arm. The vertical arm positions a fishing line and spool in the water for rotation about a horizontal axis. The upper end of the arm carries a bracket and a tip up alarm spring structure that can be cocked by a retaining structure mounted at the upper end of the arm. A release mechanism including a rod attaches to the edge of the arm rotates in response to rotation of the spool to displace the tip up alarm from a retention finger whereby the tip up alarm extends to a vertical alarm position.

14 Claims, 3 Drawing Sheets

ICE FISHING APPARATUS

CROSS REFERENCE TO RELATED APPLICATIONS

This is a continuation of my U.S. patent application Ser. No. 08/067,525 filed May 24, 1993 for an Ice Fishing Apparatus now abandoned.

BACKGROUND OF THE INVENTION

1. Field of the Invention

This invention relates to ice fishing apparatus and more specifically to such apparatus that includes a tip up alarm for indicating the presence of a fish on a hook.

2. Description of Related Art

Ice fishing generally involves drilling a hole through ice into lake or pond water, positioning ice fishing apparatus over the hole and lowering a fish hook into the water. Then a fisherman waits for a tip up alarm on the apparatus to signal the presence of a fish on the hook. The ice fishing apparatus generally includes a cover assembly that rests on the ice to cover the hole, a fishing line and a spool that releases the tip up alarm when a fish engages the hook and pulls line from the spool.

Different embodiments of ice fishing apparatus can pose any of several different problems to a ice fisherman. For example, the hole in the ice tends to refreeze over time. Some prior art ice fishing apparatus prevents or slows this refreezing process; other apparatus does not. Some ice fishing apparatus positions the fishing line spool in the water; other apparatus locates the spool above the water. During normal use the fishing line becomes wet. When wet line is wound onto a spool above the water, adjacent turns of the wet line can freeze on the spool and prevent proper spool operation. Most embodiments of ice fishing apparatus are bulky and, therefore, difficult to transport and store.

The following U.S. Pat. Nos. disclose ice fishing apparatus in which a spool is located out of the water:

- 4,662,099 (1987) Stewart
- 4,780,979 (1988) Dyck et
- 4,794,718 (1989) Tillman
- 4,953,317 (1990) Ruchel
- 4,980,986 (1991) Harper U.S. Pat. No. 4,662,099 to Stewart discloses an ice free tip up system. It includes a heated housing in the form of a covered bucket for preventing ice fishing hole freeze over. A spool, located in the bucket and remotely from the water, carries a fishing line that leads over a tip up signalling activator and then drops through the bottom of the bucket. A heater attaches to the side of the bucket and requires either a battery or fuel for operation.

U.S. Pat. No. 4,780,979 to Dyck et al discloses an ice fishing device that includes an integrally molded black plastic base member. Structure above the base member carries a fishing line spool and a spring-loaded release structure for a tip up alarm. This apparatus relies upon the heat absorbing capacity of the plastic to prevent or slow the hole and fishing line from freezing.

U.S. Pat. No. 4,794,718 to Tillman discloses an ice fishing assembly with a conical ring member and two displaceably connected sections of transparent plastic resilient material that normally enclose a top opening of the ring member and permit the extraction of fish. These plastic sections can be interchanged with styrofoam sections of the same size to retard and prevent the escape of heat and air from the water to the atmosphere. In this apparatus fishing line from the spool leads through a tip up alarm release structure and then drops through the ring member into the water.

U.S. Pat. No. 4,953,317 to Ruchel discloses a nonfreezing fishing apparatus that includes a radiant energy absorbing bubble-like cover that allows solar energy to heat the air confined under the cover. The cover overlies a fishing line spool above the water and the apparatus for releasing a tip up alarm.

U.S. Pat. No. 4,980,986 to Harper discloses ice fishing apparatus that includes a housing, a window door on the housing, an angled aperture in the bottom of the housing, a reel inside the housing, a tip up alarm and an electric light on the outside of the housing. A transparent solar energy collecting panel on one side and the top of the housing heats the inside of the housing to keep the ice hole from refreezing. The housing carries a fishing line spool. Fishing line leads directly from the spool into the water and motion of the spool causes a tip up alarm to actuate.

The Tillman and Dyck patents are subject to line freezing. In general the apparatus disclosed in the Stewart, Ruchel and Harper patents attempts to overcome problems of the line freezing by positioning the spool inside a volume that is heated either by solar or other means.

Other U.S. Patent Nos. overcome line freezing by immersing the fishing line and spool in the water. They include:

- 4,253,262 (1981) Johnson
- 5,101,591 (1992) Frazier et al

U.S. Pat. No. 4,253,262 discloses a ice fishing tip up including a floated bowl for being disposed in an ice hole. The bowl can carry charcoal or other combustible materials to maintain the bowl at an elevated temperature. The bowl also carries a vertically extending tubular member with a rotatable shaft. A fishing line spool is carried for rotation about a vertical axis at the bottom of the shaft and the line leads through an offset eye into the water. When a fish pulls the line from the spool, the spool rotates the shaft and releases a catch allowing a tip up flag to release and extend. This apparatus overcomes the problems of freezing adjacent turns of line on the spool and, so long as fuel is available, hole freeze up.

U.S. Pat. No. 5,101,591 to Frazier et al discloses an ice fishing alarm with a mounting plate that overlies an ice fishing opening. A downwardly extending support cylinder carries a spool at its lower end for rotation about a vertical axis. An L-shaped guide hook guides fishing line from the spool and mounts an axially displaceable rotatable leg member in a parallel relationship. A projection from the leg cooperates with a further L-shaped member affixed to the spool so rotation of the spool effects rotation of the leg member. A release leg at the upper end of the leg member effects release of an indicator flag. A transparent bubble member contains heat within the structure to prevent the ice from refreezing.

Each of these patents is characterized by a structure that is bulky and difficult to store and transport. Moreover, each includes specially formed components that increase manufacturing complexity and cost.

SUMMARY OF THE INVENTION

Therefore it is an object of this invention to provide ice fishing apparatus the prevents or slows refreezing of water in an ice hole, prevents adjacent fishing line turns from freezing and is adapted for storage and transport in a compact form.

Another object of this invention is to provide an ice an ice hole and prevents fishing line freezing and that is inexpensive to manufacture.

Still another object of this invention is to provide ice fishing apparatus that is inexpensive to manufacture and that is readily compacted for transportation and storage.

In accordance with this invention ice fishing apparatus includes a plate that covers a hole in the ice and an arm that detachably connects to the plate for orientation substantially normal to the plate. A fishing line spool mounts to a first end of the arm for rotation about an axis parallel to the plate and in the water. A second end of the arm carries a tip up alarm that includes a flexible support. The arm additionally includes a tip up alarm retention device to retain the flexible support in a cocked position. When the fishing spool rotates, it releases the tip alarm from the retention device.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
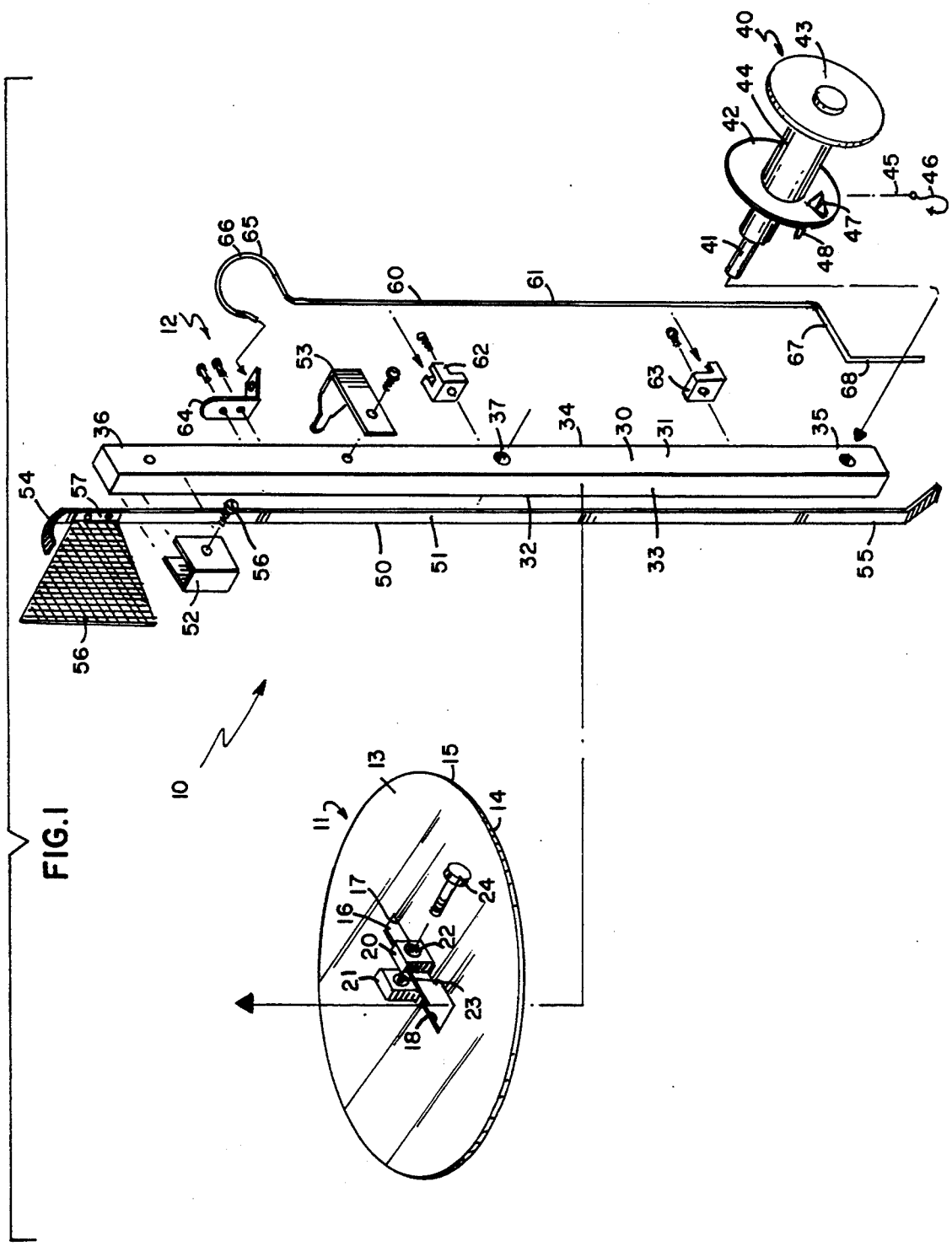
FIG. 1 is an exploded view of an ice fishing apparatus 30 constructed in accordance with this invention.
Figure 2:
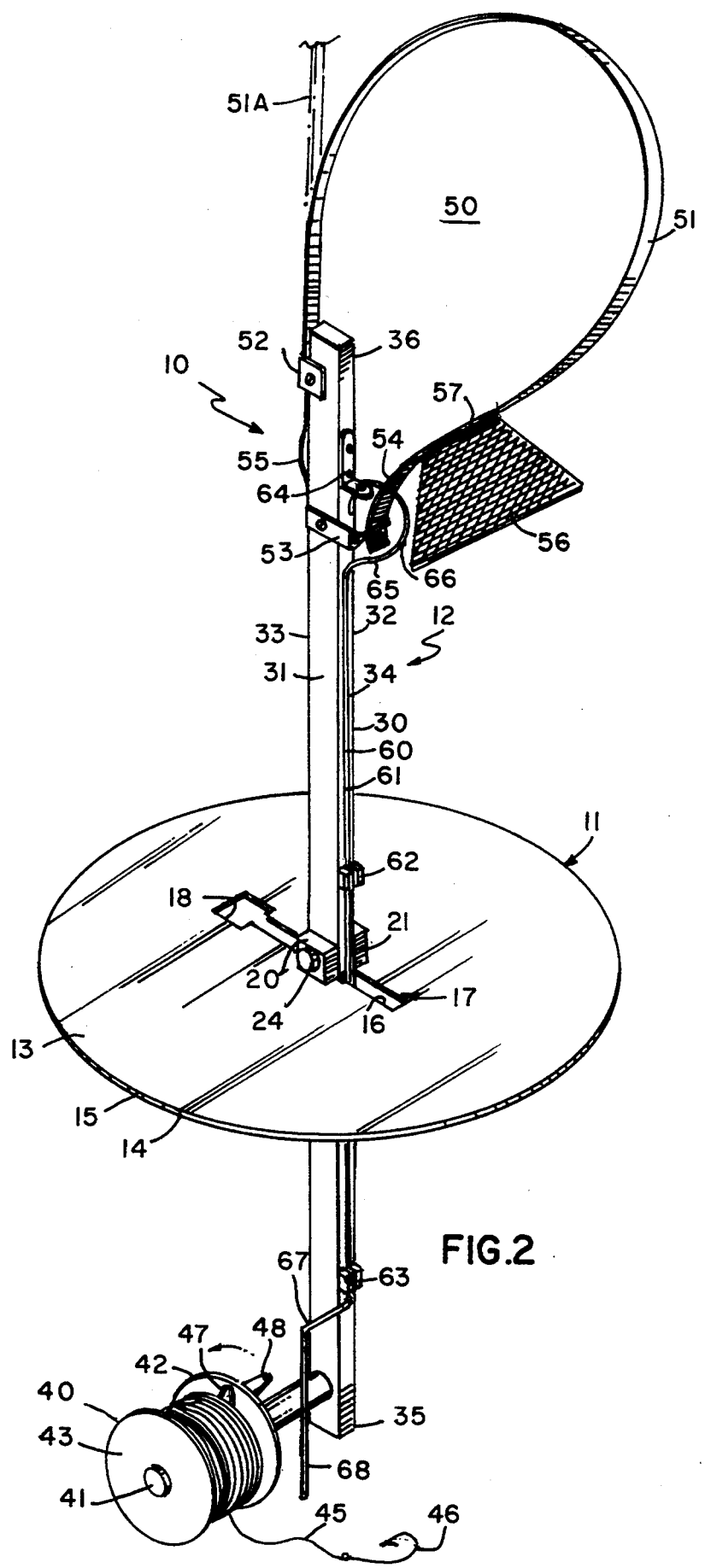
FIG. 2 is a view of the ice fishing apparatus of FIG. 1 in an assembled and compacted orientation.
Figure 3:
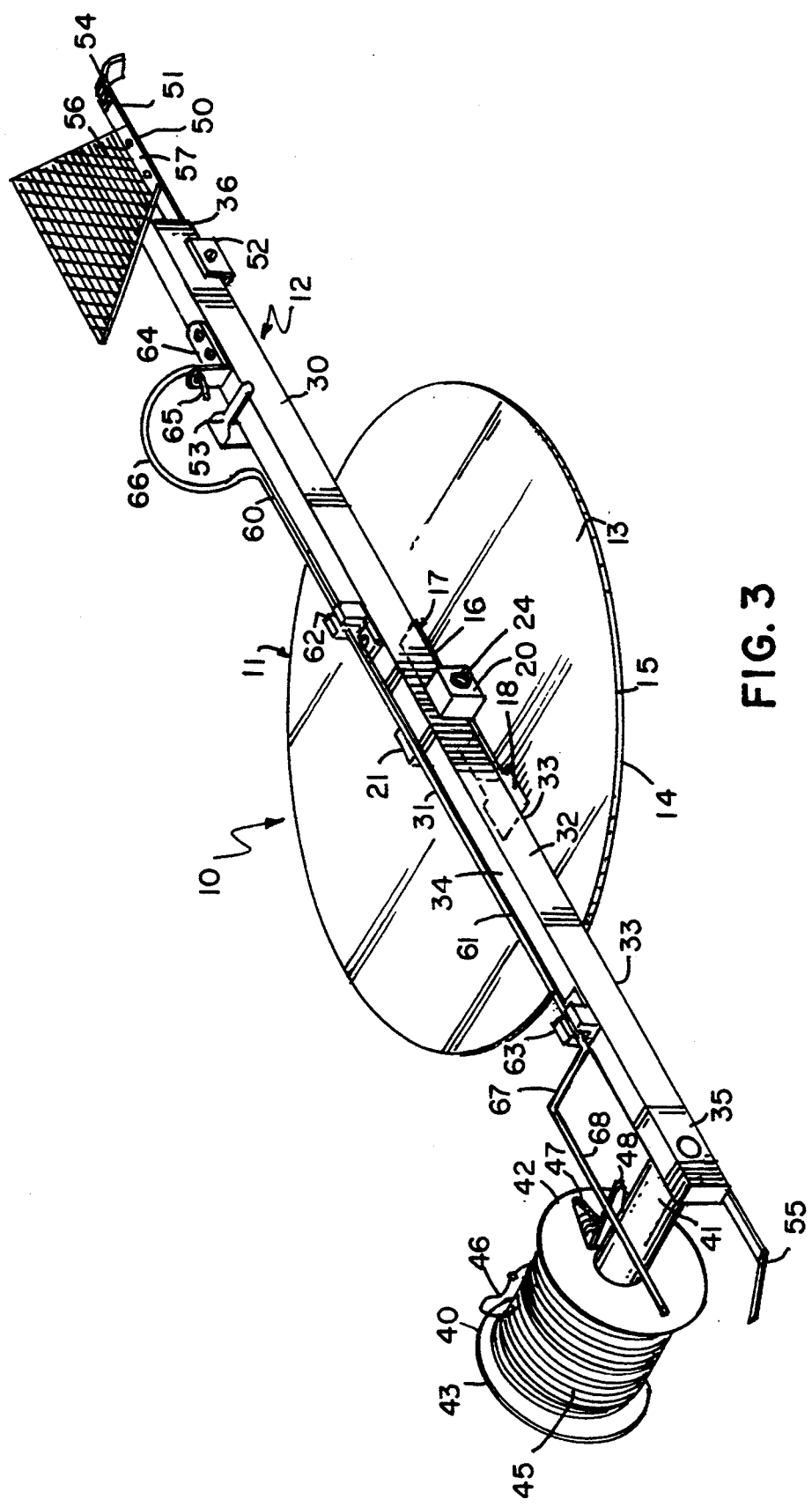
FIG. 3 is a perspective view of the apparatus shown in FIGS. 1 and 2 in compact form for storage and transport.

FIGS. 1 through 3 depict one embodiment of ice fishing apparatus 10 that incorporates this invention and attains the aforementioned objectives. The ice fishing apparatus 10 includes two main assemblies that include a plate 11 and an arm 12.

The plate 11 is formed as a thin circular disk or planar plate from a solar collector material. Black Delrin is an example of such a material that absorbs solar energy. The plate 11 has a planar top surface 13, a planar bottom surface 14 and a circular edge 15. The plate 11 covers a hole in ice. The plate 11 additionally includes centrally disposed aperture having the form of a radially extending elongated passage or slot 16 lying on a diameter of the plate 11. A first portion 17 of the slot 16 is extends beyond the center of the slot in both directions. A second or enlarged portion 18 terminates one end of the slot 16. It has a greater width than the first portion 17. Two bosses 20 and 21 located portion 17 of the slot 16 have aligned apertures 22 and 23 that receive a pivot 24 that extends transversely to the slot 16.

The arm 12 comprises an elongated rectangular body 30 of black Delrin or similar material with a first face 31, a second face 32 and first and second edges 33 and 34. The body 30 has a first end 35 adapted for immersion in water, a second end 36 and a central passage 37 extending through the rectangular body 30 between the first and second faces 31 and 32.

In use the arm 12 lies in the first portion 17 of the slot 16 essentially normal to the plate 11. The pivot 24, that can comprise a shoulder screw or similar device, extends through the apertures 22 and 23 and the passage 37 so that the rectangular body 30 can pivot with respect to the plate 11 when the pivot is loosened. However, the arm 12 will be held firmly in its vertical orientation with respect to the horizontal plate 11 when the connection at the pivot is tightened. Such pivot structures are well known in the art.

In this particular embodiment, the bosses 20 and 21 constitute a first connection element the passage 37 through the body 30 provides a second connection element and the pivot 24 constitutes a detachable structure that interconnects the first and second connection elements. As will be apparent, the removal of the pivot 24 allows the arm 12, including the rectangular body and other elements connected to the body 30, to detach from the plate 11 for storage and transportation in a very compact form as shown in FIG. 3. In this form, the arm 12 rests on top of the plate 11 and the pivot 24 locks the plate 11 and arm 12 together. As will be realized from the apparatus in FIG. 2, it is also possible to loosen the pivot 24 and rotate the arm 12 about the pivot 24 to lie obliquely to the plate 11. This will also reduce the volume required for storing and transporting the apparatus 10. Alternative forms of detachable connectors can be substituted for the bosses 20 and 21, pivot 24 and central passage 37.

The first end 35 of the arm 12 carries a fishing line spool structure that includes a spool 40 mounted for rotation about an axle 41 that parallels the plate 11 and constitutes a horizontal axis of rotation for the spool 40. More specifically, the spool 40 comprises first and second spaced end plates 42 and 43 and an intermediate cylindrical drum 44 that rides on the axle 41 and the carries the fishing line 45 and hook 46. The end plate 42 is proximate the rectangular body 30 and is stamped to form an aperture 47 and an axially extending tab 48 that is directed from the end plate 42 toward the rectangular body 30.

The body 30 also carries a tip up alarm 50 proximate the second end 36. The tip up alarm 50 comprises a flexible support structure in the form of a flat elongated spring 51. A bracket 52 mounts on the body 30 and overlies the edge 33. The bracket attaches to and is adjustable with respect to the faces 31 and 32 to provide a passage for receiving the flat spring 51. A finger 53 attaches to the face 31 and overlies the edge 34 to capture a curved end 54 of the flat spring 51. The flat spring 51, at its other end, is formed with a slight v-shaped offset 55.

The bracket 52 overlies the central portion 51 of the flat spring and is spaced from the edge 33 to capture the spring 51 loosely thereby to enable the spring 51 to slide along the edge 33 with respect to the arm 12. Fastening devices, such as a screw 56 shown in the figures or the like, attach the bracket 52 to the end 36 of the rectangular body 30. In a storage position, the spring 51 is essentially coextensive with the rectangular body 30 with the offset 55 being positioned proximate the end 35 of the rectangular body 30 for storage and transport. In use, however, the flat spring is extended beyond the end 36 until the offset 55 in the Spring 51 engages the bracket 52. The spacing of the bracket 52 from the edge 33 and the offset 55 are selected so the bracket blocks further passage by depressing and frictionally locking the offset so the flat spring 51 is fixed in an extended position.

The flat spring can then be bent until the curved end 54 engages a lower edge of the finger 53. This is a cocked position for the tip up alarm 50. A release 60 responds to rotation of the spool 40 by displacing the end 54 of the support 51 thereby to release the flat spring 51 from the constraint imposed by the finger 53. When this occurs the spring 51 straightens and displays a flag 56 that a clip 57 attaches to the spring 51 adjacent the end 54.

The release 60 is essentially coextensive with the rectangular body 30 and includes a central rod portion 61 that lies in clips 62 and 63 attached to the edge 34 of the rectangular body 30. The clips 62 and 63 receive the central portion 61 and allow the rod to rotate about a vertical axis as shown in FIGS. 1 and 2. A bracket 64 mounts to the edge 34 adjacent the second end 36 of the rectangular body 30 and above the finger 53. The upper end 65 of the rod 61 is formed in a free end 65 of a C-section 66. At the opposite end the rod 61 terminates in a 90° offset portion 67 and an extension portion 68 that is parallel to the central portion 61. The offset portion 67 and extension portion 68 lie in a plane that is essentially at right angles to the plane of the C-section 66.

In the cocked position, as shown particularly in FIG. 2, the plane of the C-section 66 is parallel to the faces 31 and 32. The plane of the offset 67 and extension 68 lies parallel to the axle 41. The extension 68 also is coextensive, vertically in the figures, with the tab 48 in either its upper or lower position. Consequently, any significant rotation of the spool 40 rotates the tab 48 into engagement with the extension 68 and pivots the rod 61 about its vertical axis. This rotation will be counterclockwise looking from the top of the rod 61 as shown in the figures. The C-section 66 rotates counterclockwise when viewed from the top and engages an edge of the flat spring 51 near the hook portion 54. Eventually the C-section 66 displaces the edge of the spring 54 beyond the end of the finger 53. When this occurs, the restraint imposed by the finger 63 is eliminated, and the spring 51 snaps to an upright position as shown by dashed lines 51A thereby to display the flag 56 and alert the fisherman that the spool 40 has moved.

As will be apparent from the description, ice fishing apparatus constructed in accordance with the embodiments of FIGS. 1 through 3 has desirable characteristics of ice fishing apparatus and meets the objectives of this invention. In the disassembled form shown in FIG. 3 that is readily accomplished by moving the pivot 24, the apparatus 10 is reduced in overall bulk so it is easy to store and transport. Although the particular disclosed embodiment depicts a pivot 24, it will be apparent that other structures that can retain the arm 24 in a vertical position relative to a horizontal disk 11 can be substituted with the same results. The apparatus comprising the plate 11 and the arm assembly 12 are easily manufactured with readily available components so requires only a minimal manufacturing cost.

Constructing the plate 11 of black Delrin or a similar solar collecting material provides sufficient heat to maintain a hole in the ice in a clear unfrozen fashion. It has been found that six hours after this apparatus was placed over a new ice hole in 5° F. weather with a −20° windchill factor and partly sunny conditions, no ice build up existed in the hole. Standard traps required continuous chipping of the ice from the hole under the same conditions.

The apparatus 10 disposes the spool 40 and the fishing line 45 in the water. Adjacent turns of the line 45 do not freeze together in use.

As shown in FIG. 3, the disassembly of the apparatus for storage or transport is improved by the use of the enlarged slot portion 18. This portion 18 allows the elongated rectangular body 30 to be removed from the plate 11 by drawing the arm 12 vertically downward. Then the arm 12 can be laid on the surface 13 of the plate 11 and secured in place by the pivot 24.

Although this invention has been disclosed in terms of a single embodiment, it will be apparent that many variations can be made to the specifically disclosed structure without departing from the spirit and scope of this invention. The plate 11 and the rectangular body 30 could be constructed of other solar collecting or other materials. The flat steel spring 51 could be formed by other structures and could use other mechanisms for providing the two distinct storage and operating positions. Other structures might be substituted for the release mechanism 60. Therefore, it is the intent of the appended claims to cover all such variations and modifications as come within the true spirit and scope of this invention.

What is claimed as new and desired to be secured by Letters Patent of the United States is:

1. Ice fishing apparatus comprising:
   A. plate means for covering a hole in ice, said plate means having a centrally disposed aperture therethrough and a first connection element proximate said aperture,
   B. arm means for orientation in an assembled form extending through said aperture, said arm means having a first end for being immersed in water, a second end and a second connection element intermediate said first and second ends,
   C. means for pivotally and releasably securing said first and second connection elements so said arm means and said plate means are selectably secured in one of plurality of orientations, wherein in a first orientation said arm means extends through said plate means aperture and is substantially normal to said plate means and wherein in a second orientation said arm means is substantially parallel to said plate means,
   D. fishing line pool means including a spool mounted proximate the first end of said arm means for rotation about an axis parallel to said plate means and fishing line for carrying a fish hook,
   E. tip up alarm including flexible support means mounted to said arm means proximate the second end thereof and means for retaining said flexible support means in a cooked position, and
   F. release means connected to said arm means having a first end for engagement by said fishing line spool means and a second end for releasing said tip alarm means from said retaining means.

2. Ice fishing apparatus as recited in claim 1 wherein said plate means is composed of a solar collector material.

3. Ice fishing apparatus as recited in claim 1 wherein said pivotal and releasable means includes a pivot for said arm means and said aperture receives portions of said arm means during pivoting thereof.

4. Ice fishing apparatus as recited in claim 3 wherein said securing means further includes means for selectively releasing said arm means from said plate means and said aperture includes a first portion having a width corresponding to the width of said arm means and a second, enlarged portion to enable passage of said tip up alarm means through said plate means whereby said arm means is separable from said plate means.

5. Ice fishing apparatus as recited in claim 1 wherein said spool includes a tab extending from an end thereof and said release means includes rod means for displacing said tip up alarm means including a central portion parallel to and pivotally connected to said arm means, a first offset portion proximate said first arm end for engagement by said spool tab and a second offset portion proximate said second arm end for displacing said tip up alarm support means from said retaining means.

6. Ice fishing apparatus as recited in claim 1 wherein said tip up alarm support means comprises a elongated flat spring having two ends and said arm means includes capture means proximate to said second end for retaining said flat spring for longitudinal displacement with respect to said arm means, one end of said flat spring being offset to engage said capture means and hold said flat spring in a fixed longitudinal position, the other end of said flat spring engaging said retaining means.

7. Ice fishing apparatus as recited in claim 6 wherein said other end of said flat spring forms a hook portion for engaging said retaining means and said retaining means is positioned on said arm means proximate said second end.

8. Ice fishing apparatus comprising:
   A. plate means for covering a hole in ice, said plate means having a centrally disposed radial slot therethrough and a first connection element proximate said radial slot
   B. arm means for orientation substantially normal to said plate means, said arm means having a first end for being immersed in water, a second end and a second connection element intermediate said first and second ends,
   C. detachable means including a pivot for said arm means for interconnecting said first and second connection elements when said arm means passes through said radial slot so said arm means can be pivotally displaced relative to said plate means in one of a plurality of positions, wherein in one position said arm means is pivotally displaced substantially normal to said plate means and wherein in another position said arm means is pivotally displaced parallel to said plate means,
   D. fishing line spool means including a spool mounted proximate the first end of said arm means for rotation about an axis parallel to said plate means and fishing line for carrying a fish hook,
   E. tip up alarm means including flexible support means mounted to said arm means proximate the second end thereof and means for retaining said flexible support means in a cocked position, and
   F. release means connected to said arm means having a first end for engagement by said fishing line spool means and a second end for releasing said tip alarm means from said retaining means.

9. Ice fishing apparatus as recited in claim 8 wherein said plate means is composed of a solar collector material.

10. Ice fishing apparatus as recited in claim 8 wherein said radial slot includes a first portion having a width corresponding to the width of said arm means and a second, enlarged portion for enabling the passage of said tip up alarm means through said plate means during separation of said arm means and said plate means.

11. Ice fishing apparatus as recited in claim 8 wherein said spool includes a tab extending from an end thereof and said release means includes rod means for displacing said tip up alarm means including a central portion parallel to and pivotally connected to said arm means, a first offset portion proximate said first arm end for engagement by said spool tab and a second offset portion proximate said second arm end for displacing said tip up alarm support means from said retaining means.

12. Ice fishing apparatus as recited in claim 8 wherein said tip up alarm support means comprises a elongated flat spring having two ends and said arm means includes capture means proximate to said second end for retaining said flat spring for longitudinal displacement with respect to said arm means, one end of said flat spring being offset to engage said capture means and hold said flat spring in a fixed longitudinal position, the other end of said flat spring engaging said retaining means.

13. Ice fishing apparatus as recited in claim 12 wherein said other end of said flat spring forms a hook portion for engaging said retaining means and said retaining means is positioned on said arm means proximate said second end.

14. Ice fishing apparatus comprising:
   A. a circular, planar plate form of a solar energy collector material for covering a hole in ice, said plate having a radial, elongated passage centered therethrough and first connection element disposed centrally of said passage;
   B. an elongated arm having a second connection element formed centrally thereof, a first end for being disposed in water and a second end,
   C. means for detachably interconnecting said first and seond connection elements whereby said arm can pivot with respect to said plate and be locked in one of a plurality of positions, wherein one position said arm is disposed in the radial elongated passage and locked so as to be normal to said plate and wherein in another position said arm is locked so as to be parallel to said plate,
   D. fishing line spool means including a spool for carrying a line and hook and an axle mounted proximate the first arm end and parallel to said plate for supporting said spool for rotation about a horizontal axis, said spool having a tab formed on an end thereof proximate said arm and parallel to and offset from said axle,
   E. a tip up alarm including a elongated flat spring having an offset portion at a first end, a hook formed at the second end and a display flag positioned proximate said hook,
   F. first spring capture means proximate the second end of said arm for loosely engaging said flat spring intermediate the ends thereof thereby to enable said flat spring to slide parallel to said arm and extend said display flag, said flat spring offset portion engaging said first spring capture means for frictionally holding said second end thereof thereby to maintain said tip up alarm in an extended position relative to said arm,
   G. second spring capture means proximate the second end of said arm for engaging said flat spring hook thereby to retain said tip up alarm in a cocked position,
   H. a rod extending parallel to and pivotally attached to said arm, said rod having a first offset portion proximate said first arm end for engagement by said spool tab and a second offset portion proximate said second arm end for engaging said flat spring proximate said hook thereby to release said tip arm alarm means from said second capture means when said spool rotates.

* * * * *